Aug. 7, 1928.
W. D. BELL
1,679,849
METHOD AND APPARATUS FOR EJECTING LUBRICANTS
Filed Aug. 6, 1923
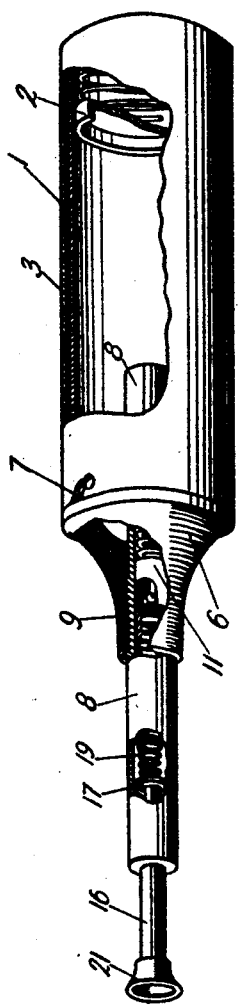
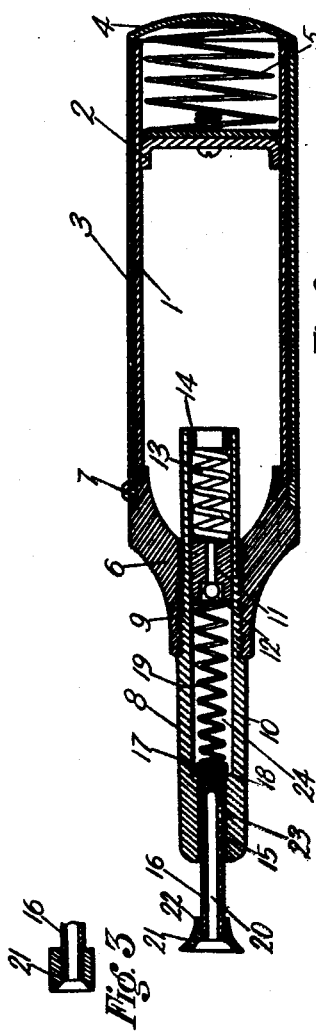
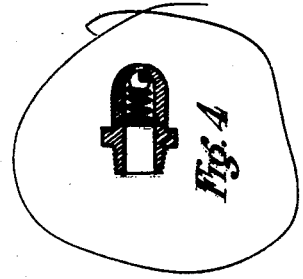
WILLIAM D. BELL _INVENTOR._
BY
Edwin P. Corbett _ATTORNEY._

Patented Aug. 7, 1928.

1,679,849

UNITED STATES PATENT OFFICE.

WILLIAM D. BELL, OF COLUMBUS, OHIO, ASSIGNOR, BY MESNE ASSIGNMENTS, TO THE BASSICK MANUFACTURING COMPANY, OF CHICAGO, ILLINOIS, A CORPORATION OF DELAWARE.

METHOD AND APPARATUS FOR EJECTING LUBRICANTS.

Application filed August 6, 1923. Serial No. 656,088.

My invention relates to a method and apparatus for ejecting lubricants, from grease and oil containers and has particularly to do with the provision of a novel type of lubricant container, in combination with novel ejecting means for efficiently and quickly discharging the lubricant under high pressure from the container and into the part to be lubricated.

In the past, in the discharging or feeding of lubricants from a container into the part to be lubricated, it has been the practice to secure the outlet of the lubricant container to the part to be lubricated by various means, such as screw thread elements or socket structures, et cetera. Lubricant has been ejected from such containers by various means, which have included manually operated, direct acting pistons and pistons which have been advanced by means of a suitable screw thread arrangement to give a slow and positive pressure. In all instances, resulting in satisfactory discharge of lubricants into the parts to be lubricated, such as automobile bearing parts, it has been necessary to equip the automobile with lubricating fixture of special design, and to use means for attaching the lubricating element to the special fixture and part to be lubricated and independently operable means for directly applying pressure to the body of the lubricant in the container to eject same. This method of discharging lubricant has presented certain difficulties, aside from the high initial cost of manufacture of the container and special fixtures, in that it is necessary to connect and disconnect the lubricating element to each individual part to be lubricated and, furthermore, it has been necessary to hold the lubricating means in one hand and to utilize means independent of the position of the lubricator relative to the part to be lubricated for ejecting the lubricant.

My invention has to do primarily with the method of building up pressure and ejecting a charge of lubricant merely by the pressure of the lubricant container against the means to be lubricated. This novel method of injecting the lubricant into the part to be lubricated is accomplished by means of an extremely simple, substantial and compact structure which comprises a means for continuously supplying a charge of lubricant to a point adjacent the outlet nozzle thereof, a novel means for isolating and placing such charge of lubricant under pressure, and a novel means for causing such charge of lubricant to be ejected from such nozzle by virtue of such accumulated pressure.

One of the objects of my invention is the provision of a novel lubricant container and resiliently supported plunger, the resilient support of such plunger being effective to continuously place the lubricant in the container under a definite pressure.

Another object of my invention is the provision of a novel element at one end of the container casing, which is provided with means for isolating a charge of lubricant from the main body of said container. The result is that the resilient plunger at one end of the lubricant container will be effective to continuously supply lubricant to the other end of the container, where it will be isolated, and in charges of definite quantities.

A further object of my invention has to do with the provision of a telescoping nozzle element and a resiliently controlled plunger for regulating the supply of lubricant to be ejected through said nozzle element. This plunger is designed to be oppositely supported by spring structures of different resiliencies. In this case the lubricant is fed through the nozzle controlling element, and when the telescoping nozzle is actuated, the lubricant on one side of such plunger will be placed under pressure by the relative reciprocation of such nozzle element.

Another object of my invention is the provision of means for resiliently opposing the reciprocation of the nozzle structure and means positioned in such nozzle structure for permitting the discharge of the lubricant which has been placed under pressure by the reciprocation of such nozzle. A still further object of my invention is the provision of a lubricant container provided with a telescoping nozzle structure, in combination with plunger structure for isolating definite charges of lubricant, whereby the pressure of the lubricant container against the part to be lubricated will be sufficient to eject a charge of lubricant by virtue of such pressure.

Various other features of my invention will be apparent as this description progresses and will be brought out in the claims appended hereto. The various objects of my invention are preferably obtained by the structure illustrated in the drawings, wherein similar characters of reference designate corresponding parts and wherein:

Figure 1 is an oblique perspective view, partly cut away, of my novel lubricant discharging device, showing the means for continuously placing the fluid in the container under pressure, the means for isolating a charge of lubricant and the nozzle structure for placing such lubricant charge under pressure.

Figure 2 is a central longitudinal section of the structure shown in Figure 1, showing in detail the ported plunger and nozzle structure and the resilient means for allowing movement of the nozzle relative to the plunger.

Figure 3 is a detailed view of a modified form of nozzle cap.

Figure 4 is a diagrammatical view of a standard lubricant admission valve, against which my nozzle cap may fit without the screwing together of such parts.

In the drawings, my lubricant container and discharging device is shown as comprising a cylindrical casing or barrel 1, one end of which is open and adapted to receive a plunger 2. The casing 1 is contained within a similar outer casing 3, which is provided with a suitable closed end 4. This end 4 is adapted to receive one end of a coil spring 5, the other end of which spring is connected to the plunger 2.

One end of the casing 1 is designed to be secured to a closure member 6, while the outer casing 3 is designed to be secured to such member by means of a suitable slot and screw structure 7 whereby the casing 3 may be easily and quickly removed for the filling of the device. It will thus be obvious that when the container is filled with lubricant the plunger 2 will be positioned at one end of the casing 1 and that coil spring 5 will be compressed, and that as the lubricant is gradually discharged from the container the plunger will be effective to place the remaining lubricant under pressure until substantially all the lubricant is discharged therefrom.

The closure element 6 is designed to receive a tube 8 and to secure such tube by means of suitable screw threads 9. The tube 8 is recessed as at 10 and is designed to receive a plunger 11 provided with a suitable port therethrough and a suitable ball check valve for controlling the flow of lubricant through such port. One end of the tube 8 is designed to receive a heavy coil spring 13, one end of which bears against a suitable bearing or washer 14, the other end of which is designed to bear against one end of the plunger 11.

The outer end of the tube 8 is recessed as at 15 to receive the barrel of a nozzle 16. This nozzle 16 is upset at its inner end as at 17, and this upset portion 17 is designed to contact with a shoulder 18 between the recess portions 10 and 15 of the tube 8. A coil spring 19, which is light in structure compared to the coil spring 13, is designed to be interposed between the plunger 11 and the upset portion 17 of the nozzle 16. It will thus be obvious that the spring 19 in acting against the heavier spring 13 will be effective to normally hold the nozzle 16 in its outer position, as shown in Figure 2, while the upset portion 17 contacting with the seat 18 will be effective to prevent the discharge or leakage of any lubricant while the nozzle is in such normal position.

Nozzle 16 comprises an inner bore or conduit 20, which extends inwardly to a point adjacent the upset end 17. The outer end of the nozzle 16 is provided with a suitable cap 21 which is preferably so shaped as to efficiently fit over or against any size or shaped opening, such as shown in Figure 4. The inner part of this cap 21 preferably forms the shoulder 22, which is designed to abut against the outer end of the tube 8 when such cap is placed against any article and the nozzle is forced inwardly. The bore of the nozzle 16 is provided with a port 23, which port is so positioned that it will preferably be completely uncovered by the shoulder 18 when the shoulder 22 abuts against the outer end of the tube 8.

In operation, with the device filled with lubricant and ready for use, pressure of the cap 21 against any lubricating fixture causes the nozzle 16 to be forced inwardly against the pressure of the spring 19. The lubricant contained within the compression chamber 24 is prevented from escaping back into the main container by the check valve 12. Thus the pressure built up by the displacing of the lubricant by the nozzle 16 will be communicated to the plunger 11 which, in turn, will slightly compress the heavy spring 13. This building up of pressure in the chamber 24 and the movement of the piston 11 against the heavy spring 13 will continue as the nozzle 16 is depressed until the continued relative movement between the nozzle 16 and the tube 8 will uncover the port 23. The immediate uncovering of the port 23 will cause the charge of lubricant in the chamber 24 to be ejected through the nozzle 16 by virtue of the pressure of the spring 13 and the pressure of the liquid within the chamber 24. Removal of the pressure holding the device against the lubricating fixture will allow the spring 19 to again project the plunger 16 to its normal position, when a new charge of lubricant will automatically flow into the compression chamber 24 due to the fact that the pressure is removed from the left-hand side of the ball check valve, as shown in Figure 2. As the lubricant within the casing 1 is continuously under pressure by virtue of the plunger 2 and coil spring 5, it will be obvious that the compression chamber 24 will be immediately filled with lubricant as soon as the plunger 16 is moved to its normal outward position and that the device will thus be again ready for operation and effective to immediately discharge a charge of lubricant into the same or any other lubricating fixture or part to be lubricated.

It will be understood that the lubricant container may be of any desired size and shape, and it will also be understood that the tube 8, as well as the compression chamber 24, may be of any desired shape and of varying sizes, whereby different size charges may be discharged through the nozzle 16 by a single operation of the device.

It is further understood that the nozzle 16, the plunger 11 and the springs 13 and 19 may be of any relative size and consist of various arrangements whereby the reciprocation of the nozzle 16 will be effective to isolate a charge of lubricant under a pressure effective to discharge the same.

It will be seen that I have provided a novel and decidedly simple lubricant container and ejecting device, which is of compact structure and adapted to positively force a charge of lubricant into any part to be lubricated merely by the pressure of such device against such part to be lubricated.

It will further be noted that the plunger and check valve structure is placed between the main lubricant container and the smaller chamber for containing a charge of lubricant and that by placing coil springs of different resiliency on opposite sides of said plunger I have made it possible to isolate a definite charge of lubricant and to place such charge of lubricant under such pressure as will be effective to discharge the lubricant when the port of the nozzle structure is uncovered.

Furthermore, it will be obvious that the combination of my simple nozzle and plunger structure, together with the different sized springs, will make possible the discharge of substantially any size charge of lubricant and at any desired pressure required in accordance with the resiliency of the coil springs 13 and 19.

It will further be obvious that by building up pressure in the compression chamber to a certain predetermined point and not releasing any of such lubricant under pressure until the port 23 is suddenly uncovered, I have provided means for obtaining an explosive action which will force the charge of lubricant into the part to be lubricated with great force, thus positively forcing the lubricant to all parts of the bearing or part to be lubricated. In other words I have provided means for obtaining maximum pressure with a minimum charge of lubricant.

Having thus described my invention, my claim is:

1. Lubricating means comprising a portable lubricant container, a cylinder receiving lubricant from said container, a plunger reciprocable in said cylinder, a spring for moving said plunger to discharge lubricant from said cylinder, a second plunger reciprocable in said cylinder for moving said first named plunger against the tension of said spring, and a valve for controlling the discharge of lubricant from said cylinder, and a coupling member for receiving said discharge and having means to form a sealed connection with a lubricant receiving member.

2. Lubricating means comprising a lubricant container, a cylinder receiving lubricant from said container, a plunger reciprocable in said cylinder, a spring for moving said plunger to discharge lubricant from said cylinder, a second plunger reciprocable in said cylinder for moving said first named plunger against the tension of said spring, and a valve port in said second plunger for controlling the discharge of lubricant from said cylinder.

3. Lubricating means comprising a container, a cylinder receiving lubricant from said container, valve means for preventing the return flow of lubricant to said container, a plunger in each end of said cylinder, a discharge conduit in one of said plungers, and a spring for moving one of said plungers toward the other.

4. Lubricating means comprising a container, a cylinder receiving lubricant from said container, valve means for preventing the return flow of lubricant to said container, a discharge device for said cylinder having means to make a sealed connection with a lubricant receiving nipple, a plunger in each end of said cylinder, a spring for moving one of said plungers toward the other, and a spring for moving the other plunger away from said first plunger.

5. Lubricating means comprising a cylinder, means for supplying lubricant to said cylinder, means for preventing return flow of lubricant to said supply means, a nozzle for making sealed detachable connection with a lubricant receiving device, said nozzle adapted to communicate with said cylinder, means comprising a spring for displacing lubricant through said nozzle, and means for tensioning said spring when said cylinder is moved towards said nozzle.

6. Lubricating means comprising a cylinder, means for supplying lubricant to said cylinder, a plunger for discharging lubricant from said cylinder, a spring for moving said plunger to discharge lubricant from said cylinder, and separate means acting on the lubricant in said cylinder for moving said plunger in the opposite direction for tensioning said spring.

7. Lubricating means comprising a cylinder, means for supplying lubricant to said cylinder, a plunger for discharging lubricant from said cylinder, a spring for moving said plunger to discharge lubricant from said cylinder, and means acting on the lubricant in said cylinder for moving said plunger in the opposite direction for tensioning said spring and for subsequently releasing said spring.

8. Lubricating means comprising a source of lubricant under pressure, a compression chamber, a conduit from said source to said chamber, a check valve controlling communication between said chamber and said source, means for connecting said chamber to a bearing to be lubricated, compressing means at said chamber for producing a decrease in the volume of the chamber, resilient means for permitting said compressing means to act only by developing a high hydraulic pressure, and means conditioned on full stroke actuation of said compressing means for opening a free unobstructed passage out of said chamber and into said connecting means.

9. Lubricating means comprising a compression chamber, means for connecting said chamber to a point to be lubricated, means for feeding lubricant into said chamber under initial pressure, a first plunger movable into said chamber to produce a decrease in the net volume thereof, a second plunger yieldingly mounted to form a movable wall for said chamber and permit said first plunger to move in, and means for opening said connection means only after a predetermined movement of said plungers.

10. Lubricating means comprising a chamber, means for connecting said chamber to a point to be lubricated, resilient means cooperating with said connecting means for building up in said chamber a pressure greater than that necessary to initiate a flow to the point to be lubricated, and then suddenly releasing the compressed lubricant into said connecting means, said chamber having an inlet, and means for delivering lubricant to said inlet under initial pressure less than the discharge pressure.

11. A lubricant compressor comprising a barrel, means for automatically discharging lubricant from said barrel, a cylinder for receiving lubricant from said barrel, a spring-operated plunger in said cylinder, a reciprocable nozzle separate from said plunger for conducting lubricant from said cylinder to a device for receiving lubricant, and valve means controlling the flow of lubricant from said cylinder to said nozzle.

12. A lubricant compressor comprising a barrel, means for automatically discharging lubricant from said barrel, a cylinder for receiving lubricant from said barrel, a plunger in said cylinder, a reciprocable nozzle separate from said plunger for conducting lubricant from said cylinder to a device for receiving lubricant, and valve means controlling the flow of lubricant from said cylinder to said nozzle.

13. A lubricant compressor comprising a barrel, a cylinder for receiving lubricant from said barrel, means for isolating the lubricant in the cylinder from the lubricant in the barrel, means for subjecting the isolated lubricant to spring pressure, means for increasing the pressure on the lubricant in said cylinder above the pressure of the lubricant in the barrel, and means for conducting the lubricant from said cylinder to a device to be lubricated, said conducting means having a part for effecting a sealing connection with a lubricant receiving member.

14. A lubricant compressor comprising a barrel, a cylinder for receiving lubricant from said barrel, conduit means for subjecting the lubricant in said cylinder to spring pressure, means including a spring for increasing the pressure on the lubricant in said cylinder, and means for conducting the lubricant from said cylinder to a device to be lubricated.

15. A lubricant compressor comprising a barrel, a cylinder for receiving lubricant from said barrel, a plunger for discharging lubricant from said cylinder, a valve controlling the flow of lubricant from said cylinder, and means including a spring for causing said plunger automatically to discharge lubricant from said cylinder when said valve is opened and conduit means in said plunger.

16. A lubricant compressor comprising a barrel, a cylinder communicating with said barrel, spring actuated means for discharging lubricant from said cylinder, a valve for controlling the discharge of lubricant from said cylinder, and means actuated by pressing said barrel toward a part to be lubricated for tensioning said spring prior to the opening of said valve.

17. A lubricant compressor comprising a barrel, a cylinder communicating with said barrel, a plunger for discharging lubricant from said cylinder, resilient means for operating said plunger, and means for tensioning said resilient means, and a discharge conduit integral with said plunger.

In testimony whereof I hereby affix my signature.

WILLIAM D. BELL.